United States Patent [19]
Green

[11] 3,751,240
[45] Aug. 7, 1973

[54] METHOD OF ROASTING COPPER SULPHIDE CONCENTRATES AND ORES

[75] Inventor: George E. Green, Tucson, Ariz.

[73] Assignee: Banner Mining Company, Tucson, Ariz.

[22] Filed: June 7, 1971

[21] Appl. No.: 150,664

[52] U.S. Cl. ............................... 75/1, 75/72, 75/117
[51] Int. Cl. ..................... C22c 1/16, C22c 15/08
[58] Field of Search ...................................... 75/3–5, 75/117, 72

[56] References Cited
UNITED STATES PATENTS
1,509,774  9/1924  Perkins .................................. 75/72
FOREIGN PATENTS OR APPLICATIONS
528,131  7/1956  Canada .................................. 75/72
10,688  12/1927  Australia .............................. 75/117

Primary Examiner—A. B. Curtis
Attorney—Harris, Kiech, Russell & Kern

[57] ABSTRACT

A method of roasting copper-iron-sulphide ore concentrate or mixture, wherein the ratio of sulphur values to copper values is preferably at least one, to yield a calcined product, for the separation and recovery of copper values by acid leaching and electrolytic deposition, having at least 99 percent of its copper values soluble in dilute sulphuric acid and no more than 10 percent of the iron values soluble in dilute sulphuric acid. The method comprises oxidizing the concentrate in the following three step reaction sequence: 1) 1–1.5 hours at a temperature between about 280° and about 360°C; 2) 1–1.5 hours at a temperature between about 475° and about 540°C; and 3) 0.5–1.0 hour at a temperature between about 640° and about 690°C.

3 Claims, 5 Drawing Figures

INVENTOR
GEORGE E. GREEN
BY HIS ATTORNEYS
HARRIS, KIECH, RUSSELL & KERN

METHOD OF ROASTING COPPER SULPHIDE CONCENTRATES AND ORES

BACKGROUND OF THE INVENTION

The demand and use for copper is increasing at such a rate that world consumption during the past 10 years has exceeded the total consumption throughout all preceding history. Production on such a scale is only possible by exploitation of the vast resources of copper present in low-grade disseminated primary sulphide deposits. The high-grade secondarily enriched deposits, containing a preponderance of chalcocite ($Cu_2S$) with minor amounts of covellite ($CuS$), and elemental metallic copper have been almost completely exhausted. Considerable potential copper reserves exist in the form of very low-grade disseminated oxidized copper minerals (silicates and carbonates) and this type of potential reserves is of common occurrence as a capping overlying the sulphide orebodies. It is probable that it would be technically feasible to extract the copper from most of such oxidized occurrences by heap-leaching with dilute sulphuric acid followed by precipitation of copper from solution with metallic iron. At present, less than 10 percent of the world copper production is derived from such oxidized copper minerals, because low-cost iron and acid are not available in sufficient quantity at the site of the mineral location for leaching and precipitation.

To produce copper in the required amounts, it has been necessary to exploit the hugh masses of low-grade sulphide ores consisting mostly of chalcopyrite (commonly written as $CuFeS_2$, more rarely as $Cu_2S.Fe_2S_3$) disseminated as minute specks constituting a very small percentage of the weight of the host rock. Those portions of the mineralized deposits commonly regarded as commercial ores usually assay 0.35 to 0.85 percent copper. Exploitation of such lean material is only made possible by large-scale attack, using huge units of equipment and mass-production methods. Theoretically, chalcopyrite consists of 34.5 percent copper, 30.5 percent iron and 35.0 percent sulphur but actually there is usually a small content of iron pyrite, $FeS_2$, blebs so finely intermixed that perfect separation is impossible. Usually the host rock also holds a small molybdenum content, 0.01 percent to 0.35 percent, which is concentrated along with the copper mineral in a flotation mill and later separated from the copper mineral in a secondary process. Since the value of a pound of molybdenum is about three times that of a pound of copper, the incidental occurrence and recovery of the molybdenum as a byproduct can be an important item in the economics of copper production. Occurrences of other copper sulphide minerals are known such as chalcocite, $Cu_2S$, bornite, $Cu_5FeS_4$, covellite, $CuS$, and enargite $Cu_3AsS_4$, but chalcopyrite, $CuFeS_2$ is by far the most common mineral of copper as found in nature. The ore, as mined, is crushed in several stages, ground to suitable size and concentrated by flotation processes to a product consisting, typically, of 28 percent copper, 30 percent iron, 32 percent sulphur, 9 percent insoluble ($SiO_2$ etc.) and 1 percent miscellaneous ($CaCO_3$ etc.). These typical analyses represent determinations made on a dry basis. Actually, the concentrator product is usually a filter cake containing 9–10 percent residual water which may or may not be dried before shipment to a smelter. The smelting process, in essentially two separate steps, reduces the copper to a metallic slab of some 99.5 percent purity which is then reshipped to an electrolytic refinery for refining by electrolysis to 99.85+% purity. The producing mine, therefore, pays for freight and smelting on a tonnage basis consisting of some 70 percent waste (including 10% water content) and pays freight and treatment costs for refining the copper after smelting.

The copper sulphide concentrate is shipped to a smelter in a still unfinished form for separation of the copper by pyrometallurgical methods. Mineral deposits are frequently located in inaccessible areas distant from smelters. Smelting concerns tend to locate where fuels and fluxes (silica, lime-rock etc.) are plentifully available and at sites accessible to rail-heads. Generally such locations are remote from copper ore deposits. Only eight states in the United States of America have copper smelters serving domestic producers and only one state has more than one copper smelter within its borders. At the present time, domestic smelters are taxed beyond capacity, partly because the smelting companies have decreased smelter tonnages (except where special commitments require otherwise) and partly because concentrate tonnages have increased. At present, concentrates are being stockpiled.

The copper smelting process has changed very little in the past 90 years except for adoption of natural gas as fuel. The use of natural gas has lessened the amount of particulate matter discharged from smelter stacks but sulphur dioxide in smelter emissions has remained an unsolved pollution problem. The conventional smelting process consists essentially of two steps: 1) Melting of the charge into a "matte" composed of $Cu_2S \cdot FeS$ and 2) Conversion of the matte to copper metal by dispelling sulphur as $SO_2$ and causing the iron to report in a slag as an oxide of iron. Because of the growing concern and public action regarding air pollution, and the failure of technology to find any ultimate use for sulphurous smelter fumes other than for production of sulphuric acid which cannot be used in its entirety at the smelter site and cannot be economically marketed because of the shipping costs, there is little incentive for anyone to increase the present copper smelting capacity until the pollution problem is solved.

At the present time, much copper concentrate is being shipped abroad for toll-smelting in foreign countries, a practice made necessary because of the already insufficient capacity of domestic facilities. The copper smelter does not produce a refined and finished product, but rather a rough slab of about 99.5 percent purity which must then be shipped to a refinery for further treatment. There are several copper refineries in the western U.S. but much of the copper produced and smelted in the west is refined on the eastern seaboard.

Several mines have plants for treating copper ores by dissolving the oxidized copper minerals with dilute sulphuric acid. These plants have greatly increased their production and their copper metal reserves. But the practice of building plants at mine sites has not become wide-spread because of one or more of the following reasons:

1. Lack of a dependable acid supply at reasonable costs.
2. Lack of a dependable supply of precipitating agent in sufficient amounts at reasonable costs.
3. Failure of technology, prior to the present disclosure, to develop a method of roasting copper sulfide ores which releases sulphur in oxidized gaseous form, fixes iron as an acid-insoluble oxide, and converts 99+% of the copper to a form soluble in dilute sulphuric acid.

When a solution containing copper and diluted sulphuric acid (of sufficient acid strength to effect satisfactory conductivity) is caused to flow through a cell containing insoluble anodes (positive poles) alternately spaced at correct intervals from copper cathodes (negative poles) under an applied direct current of suitable voltage and amperage, metallic copper of very high purity (+99.9 percent) can be deposited from the solution onto the cathode as a bright, firm and smooth deposit, with the concomitant formation of one molecule of sulphuric acid for each atom of copper deposited. it has long been known that soluble ferrous sulphate ($FeSO_4$) present in the solution tends to become oxidized, during the electrolytic process to form ferric sulphate, $Fe_2(SO_4)_3$, which is a solvent for metallic copper, hence a potential detriment to the electrical efficiency of the process. Thus the amount of acid-soluble iron must be minimized for efficient electrolytic deposition of copper. When iron is present in electrolyte in amounts less than 3 grams per liter as ferric iron (i.e., oxidized iron, $Fe_2(SO_4)_3$), the deleterious effect is not serious. Many different methods are known to the art and have been successfully applied commercially for the purpose of purifying the electrolyte and the elimination of harmful impurities, commonly arsenic, antimony, molybdenum, iron, etc., but all such methods known to be effective in the elimination of iron are cumbersome, troublesome, result in bulky precipitates difficult to handle, add an unwanted expense to the electrolytic process and are consequently preferably avoided whenever possible.

Many technicians have attempted to roast finely divided copper sulphides to the desired $CuO + CuSO_4 + Fe_2O_3$ end product in so-called fluidized-bed roasters, because of the superficial simplicity and amenability to automated control of such apparatus. The results have been unsatisfactory for several reasons:

1. The material in a fluidized-bed roaster is kept in a suspension physically resembling a boiling liquid by means of ascending gas currents introduced through ports in the floor of the roaster. Commonly 85–90 percent of the roasting material is blown out the top gas exit as dust. These dust particles frequently have had only a few seconds of residence time in the roasting compartment, while the heavier material will have 3.0 to 3.5 hours of residence time in the roaster before leaving via the overflow port which exits on the side of the apparatus. As a consequence the heavier material is properly roasted while the lighter dust-borne material is generally under-roasted. The large dust carry-over with the exiting gas necessitates large secondary installations.

2. As sulphides become oxidized to sulphates they become sticky or "tacky." This phenomenon, coupled with the fact that temperature is controlled in the fluidized-bed roaster by injections of water and the introduction of feed as a slurry leads to the formation of concretions which build up on the walls and cause plugging or partial plugging of the roaster's ports.

3. In the single-stage fluidized-bed roaster, the same temperature is maintained at every point at all times and there is no possibility of conducting a roast through the sequence of controlled steps at different temperatures.

In this context, it has long been known that copper sulphide ores containing iron minerals can be roasted in an oxidizing atmosphere with constant stirring or rabbling to yield an end product in which the major part of the copper is present as cupric oxide, $CuO$ and/or cupric sulphate, $CuSO_4$, both of which are readily soluble in dilute sulphuric acid, and in which the major part of the iron is present as ferric oxide, or hematite, $Fe_2O_3$, which is insoluble in dilute sulphuric acid. In this regard, technical literature published some 50 years ago, contains articles on test-roasting copper sulphides in a 7 to 8 hour roast period conducted with a slowly rising reaction temperature having a maximum limit of 645° C. These test roasts produce a product which is unsuitable for present electrolytic recovery methods because the roasted product contains appreciable amounts of soluble iron which interferes with electrolytic deposition of copper. In addition, the first several hours of the roast period were conducted at temperatures below the ignition point of chalcopyrite. This is an unproductive and uneconomical practice, since chalcopyrite is not oxidized below its ignition temperature.

At first glance, roasting of copper concentrates would appear to be a simple, straight-forward procedure but in reality the process is extremely complex, presenting many opportunities to vary from the procedures or conditions necessarily correct throughout to insure optimum results, and prior to the present disclosure, without any suggestion of clues necessary to improve on less than optimum results. Most previous experimentalists have abandoned their attempts because of the relatively large losses of copper from the formation of acid-insoluble copper values and/or the large quantities of acid-soluble iron formed.

There are many plants in the United States equipped with hearth roasters which can be employed to conduct a roast through a sequence of temperature controlled roasting steps. Unfortunately hearth roasters are not presently being commercially used for the purpose of roasting copper sulphide concentrates to a soluble form, because the apparently long roasting time necessary and the previous failure to recognize the basic principles essential to decrease residence time and to increase efficiency discouraged long-range research programs and/or commercial installations.

SUMMARY OF THE INVENTION

The present invention pertains to a method for roasting finely ground sulphide copper concentrates, including ores, in an oxidizing atmosphere to obtain a product in which 99.0 percent or more of the copper is soluble in dilute sulphuric acid (1–10 percent by weight), in which 90.0 percent or more of the iron is insoluble in such dilute sulphuric acid and from which 95.0+% of the sulphur has been either expelled as oxygenated gases during the process or is present as a water soluble sulfate salt. More particularly, the present invention comprises a roasting process in which the finely divided copper sulphide concentrates, including ores, are roasted in well-defined stages, each stage at a successively higher temperature, with the temperature at each stage lying within the limits of a range specifically favorable for given chemical changes and reactions desired. The ratio of sulphur values to copper values in the concentrate is preferably equal to or greater than 1:1, i.e., $S/Cu \geq 1$. However, the ratio of sulphur to copper can be less than one so long as there are sufficient sulphur values to form acid-soluble and water-soluble copper sulphate values from the copper values. The end purpose of the process is to change the original material into a calcined product which can be leached with dilute sulphuric acid (1–10 percent by weight) to yield a solution containing at least 25 grams of copper per liter and not more than 3 grams of iron per liter, with 95 percent of the original sulphur being either expelled as oxygenated gases during the roasting (thus becoming available for sulphuric acid manufacture or other use) or retained in the calcine as a water-soluble copper sulphate. The high-copper low-iron solution is used after clarification as an electrolyte for the electrolytic deposition of high-purity copper with no need for further refining. The low-iron content insures high electrical efficiency in the copper-deposition cells, except at the latter section of the electrolytic department, but since the bulk of the copper would be precipitated at high current efficiency, the weighted overall electrical efficiency would be acceptable.

The copper sulphide roast conducted in the manner of the present invention results in a product containing one-half to two-thirds of its copper as water-soluble $CuSO_4$. The electrolytic deposition of one atom of copper from $CuSO_4$ results in the formation of one molecule of sulphuric acid as — $CuSO_4 = H_2O = Cu + H_2SO_4 + ½ O_2$. One-fourth to one-third of the original sulphur entering the roaster will emerge from the tail end of the electrolytic bank as free sulphuric acid available for use as an effective leaching acid on oxidized ores. The leached calcines constitute a high-grade iron ore (the oxide, $Fe_2O_3$) and can be used as such, or can be reduced to metallic sponge iron which can be used as a precipitant for copper acid leached from low-grade dumps.

DESCRIPTION OF THE DRAWINGS

In FIGS. 2 to 5, inclusive, the line designated A represents the percentage of acid-soluble copper, the line designated B represents the percentage of water-soluble copper, and the line designated C represents the percentage of acid-soluble iron.

DETAILED DESCRIPTION OF THE INVENTION

Figure 1:
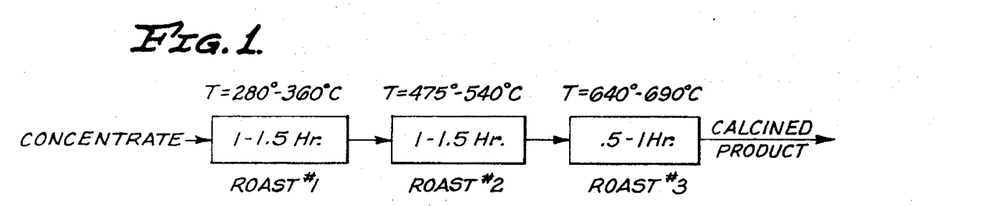
FIG. 1 is a schematic flow diagram of the process of the present invention.

Referring to FIG. 1, it is seen that the present process is a roasting process having three consecutive oxidation steps conducted within specific temperature ranges for limited periods of time.

Preferably the present process is conducted in a multiple-hearth roaster, known variously as the Herreshoff, Skinner, Wedge or Macdougall furnace. This is a circular furnace with six or more superimposed stationary hearths in which the raw sulphides enter at the top and are stirred around by revolving rakes or rabbles and simultaneously propelled alternately to the center of one hearth, thence dropping down and being raked to the outer edge of the next hearth below, thence dropping again and being moved to the center, etc., until the roasted material reaches the bottom discharge port. The rabbles or rakes are hollow and may be cooled by air or water circulating through them. The top hearth may be used as a dryer. Heat can be admitted on any hearth from gas or oil burners. Exit gases can be recycled from any hearth to any hearth in any proportion desired either for the purpose of preheating or to build up the $SO_2$ concentration in the gas. This type of roaster is suitable for the oxidation roasting of finely divided copper sulphide concentrates in the sequence of stages at successively higher temperatures as found necessary in my invention because the temperature of any hearth can be kept within the range desired and the residence time at each temperature range can be governed by the number of hearths allotted to each temperature range augmented, if necessary, by position of drop-holes and angle of rabble teeth. The quantity of material issuing as dust from a hearth-type roaster is only a small fraction of that issuing from a fluidized-bed roaster. The chief disadvantages in the use of hearth roasters to roast copper-iron sulphides, prior to the present invention, have been failure to attain an end product in which practically all (99+%) of the copper present is soluble in dilute sulphuric acid (1–10 percent must weight), in which less than 10 percent of the total iron content exists in a form soluble in such dilute acid, and failure to approach such efficiencies in elapsed roasting times of less than 7.0–7.5 hours. To overcome these disadvantages, it is necessary to recognize the true chemical reactions that occur, the proper sequence in which they mus occur, and the time necessary for each reaction.

Figure 2:
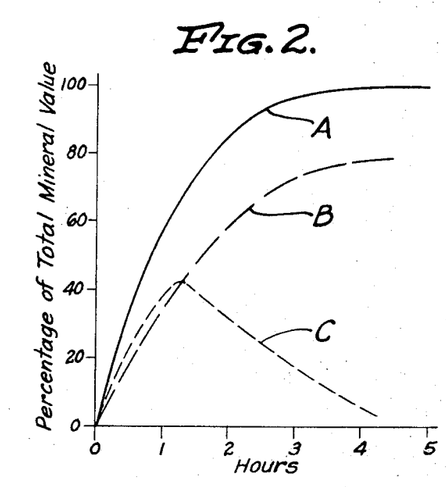
FIG. 2 is a graph showing the percentage of soluble mineral values in course of the process.

To roast sulphide concentrates of copper to an end product in which practically all (99+%) of the copper present is soluble in dilute sulphuric acid (1–10 percent by weight) and in which less than 10 percent of the total iron is present in a form soluble in such dilute acid (see FIG. 2 based on Test No. B–2W, infra), my preferred method comprises the following steps.

1. The dried, finely ground material is roasted, with constant and thorough stirring or rabbling, within a preferred temperature range of about 280°C. to about 360°C. for about 1.0 to about 1.5 hours in an oxidizing atmosphere. For normal concentrates, which contain more than 25 percent sulphur, no extraneous heat is required after the initial ignition, since the burning sulphur is more than ample to sustain the roasting. Copious fumes of $SO_2$ are evolved during this step. The purpose of the first stage or step is to convert highest possible percentage (at least 30 percent) of iron to dilute sulphuric acid-soluble iron values. By acid-soluble iron values, I means that iron material which will dissolve in a 5 percent (by weight) sulphuric acid solution when agitated gently for 30 minutes at 180°F. Roasted material leached in 5 percent sulphuric acid with gentle agitation at room temperature for 6 hours will yield approximately as much acid-soluble copper as the same sample will when leached for 30 minutes at 180°F. However, the amount of acid-soluble iron values derived from the 6-hour cold leach is usually less than that derived from the 30-minute hot leach due to increased selectivity of dilute sulphuric acid toward copper over iron at lower temperatures.

2. The hot material from step 1 is allowed to proceed to the next stage of the roasting unit where it is further roasted, with constant and thorough stirring or rabbling, within a preferred temperature range of about 470°C. to about 540°C. for about 1.0 to about 1.5 hours in an oxidizing atmosphere. Some extraneous heat will be required to sustain this temperature range at this stage. The primary purpose of this second stage or step is to convert the highest possible percentage of copper material to be present as acid-soluble copper values and the highest possible percentage of copper material as water-soluble copper values. For purposes of this invention, the term "acid-soluble copper values" means that copper material which will dissolve in a 5 percent (by weight) sulphuric acid solution when agitated gently for 30 minutes at 180°F. By the term "water-soluble copper values," I mean that copper material which will dissolve in distilled water when agitated gently for 30 minutes at 180°F.

3. The hot material from step 2 is allowed to proceed to the next stage of the roasting unit where it is further roasted, with constant and thorough stirring or rabbling, at a temperature above 580°C., preferably within a temperature range of about 640°C. to about 690°C, for about 0.5 to about 1.0 hour in an oxidizing atmosphere. Extraneous heat will be required to sustain this temperature range at this stage. The primary purpose of this stage is to obtain the greatest possible oxidation of iron values to the acid-insoluble form, $Fe_2O_3$, without sacrificing any of the potential copper solubility found at the end of step 2. Temperature-measuring instruments are not infallible; a decrease in water-soluble copper values at the end of step 3 vs. that at the end of step 2 may means that the finishing temperature was slightly high. A substantial decrease in acid-soluble copper values at the end of step 3 vs. that at the end of step 2 indicates that the finishing temperature was too high causing the formation of insoluble copper ferrites, $CuO \cdot Fe_2O_3$.

It should be recognized that there could be some variance in temperatures employed without departing from the spirit of the invention particularly because high concentrations of $SO_2$ and/or $SO_3$ in furnace atmospheres tend to favor the formation of sulphates, while absence of or a very low concentration of $SO_2$ and/or $SO_3$ facilitates the decomposition of sulphates. These phenomena have their greatest impact on the latter part of the roasting where a high $SO_2$ and/or $SO_3$ strength would be compatible with maintaining temperature near the upper limit of the cited range, i.e., 690°C, and a low $SO_2$ and/or $SO_3$ concentration would be compatible with employment of temperatures near the lower limit of the range cited, i.e., above 540°C, preferably about 640°C.

It is not intended that the subsequent treatment of the roasted mineral forms any part of the present invention, although the solid end product is designed to constitute suitable material for leaching with dilute sulphuric acid to produce a high-copper low-iron sulphate solution suitable for electrolytic copper deposition, leaving a leached residue containing any gold and/or silver values which may be recovered by cyanidation or other means, with said leached residue being composed largely of iron with potential value as iron ore, or after reduction to metallic sponge, of potential value as a copper precipitant.

From hundreds of roasting tests made on finely divided copper sulphide concentrates and ores from various sources, I have discovered the following:

1. In roasted calcines, the percentage of contained copper soluble in dilute sulphuric acid will not be satisfactory (above 99.0 percent) unless at least one-third to two-thirds or more of the total copper values are soluble in water alone.

2. In roasted calcines, the percentage of iron values soluble in dilute sulphuric acid will not be satisfactory (less than 10 percent of the total iron present) unless the last stage of the roast attains a temperature of 540° C. or higher.

3. The most successful roast is one in which the end product contains all of its copper values either as $CuSO_4$ (water-soluble copper sulphate) or $CuO$ (cupric oxide soluble in dilute sulphuric acid) and all of its iron as red, non-magnetic $Fe_2O_3$ (hematite insoluble in dilute sulphuric acid), and no roast will be satisfactory unless a high content of acid-soluble iron is attained during the first stage.

Figure 3:
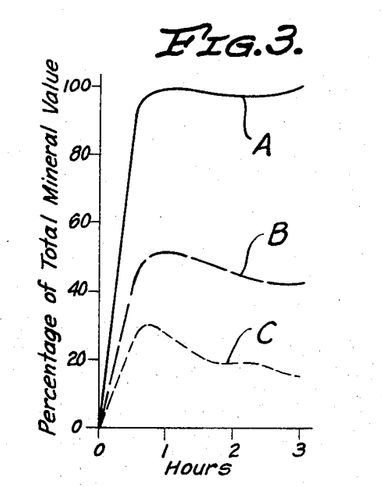
FIG. 3 is a graph showing the percentage of soluble mineral values in a roasting process employing a high temperature first step.

4. The first stage reaction time of 1.0 to 1.5 hours is all important. If required conditions are not maintained and desired chemical changes are not achieved during the first stage, no corrections can be made later to rectify deficiencies and the roast results will be unsatisfactory. FIG. 3 illustrates the unsatisfactory results of a roast wherein during the first step the concentrate is subject to a high temperature of 480° C. (See Test No. 26 N2 A-2, infra.)

5. Statements frequently found in technical literature to the effect that copper sulphides in the presence of iron cannot be successfully roasted to a product wherein the copper values are almost entirely soluble in dilute sulphuric acid because of the tendency to form insoluble ferrites ($CuO \cdot Fe_2O_3$) when copper and iron particles are in juxtaposition is not a valid statement with respect to the present process. In fact, an increase in the iron sulphide content in a copper concentrate improves the present roasting process and maximizes the acid-soluble copper values and acid insoluble iron values because of the concomitant increase in the sulphur:copper ratio.

The variable with the greatest impact upon roasting time is the sulphur:copper ratio. Roasting time decreases with increased ratios of sulphur to copper. This relationship is due to the fact that optimum creation of water-soluble $CuSO_4$ and acid insoluble $Fe_2O_3$ is dependent upon a plenitude of $SO_3$ being liberated from combination with iron values, such as in $2CuO + Fe_2O_3 \cdot 2SO_3 + heat = 2CuSO_4 + Fe_2O_3$. This reaction also illustrates 1) the reason for the desirability of having a sulphur:copper ratio of 1:1 or greater, 2) the reason for chalcopyrite ($CuFeS_2$) being easier to roast successfully than chalcocite ($Cu_2S$), and 3) the reason for adding iron pyrite ($FeS_2$) to a copper bearing roaster feed that is deficient in sulphur for roasting purposes.

To proceed with the chemical compounds and chemical reactions involved in roasting finely divided copper sulphide concentrates and ores to a product suitable for the derivation of a high-copper low-iron sulphate electrolyte, then, the following list is sufficiently inclusive to disclose all principal reactions necessary to achieve satisfactory results on any such materials occurring in large commercial quantity. These reactions are numbered, not necessarily in order of occurrence or importance, but rather for purposes of later reference.

1. Raw material = chiefly chalcopyrite, $CuFeS_2$.
2. $CuFeS_2 + 4 O_2 = CuSO_4 + FeSO_4$.
3. $2 CuFeS_2 + 7 O_2 = CuO + CuSO_4 + FeO + FeSO_4 + 2 SO_2$.
4. $4 FeO + O_2 = 2 Fe_2O_3$.
5. $8 CuFeS_2 + 27 O_2 = 6 CuO + 2 Fe_3O_4 + 2 CuSO_4 + 12 SO_2 + 2 FeSO_4$.
6. $2 CuFeS_2 + 7 O_2 = CuO + CuSO_4 + Fe_2O_3 + 3 SO_2$.
7. $4 Fe_3O_4 + O_2 = 6 Fe_2O_3$.
8. $4 FeSO_4 + O_2 = 2 (Fe_2O_3 \cdot 2 SO_3)$.
9. $Fe_2O_3 \cdot 2 SO_3 + 2 CuO = Fe_2O_3 + 2 CuSO_4$.
10. Raw material may include some chalcocite, $Cu_2S$.
11. $2 Cu_2S + 3 O_2 = 2 Cu_2O + 2 SO_2$.
12. $2 Cu_2O + 2 SO_2 + 2 O_2 = 4 CuO + 2 SO_3$, and 12-a. $4 CuO + 2 SO_3 = 2 CuO + 2 CuSO_4$.
13. $CuO + SO_3 = CuSO_4$ (slowly reversible at temperatures higher than 660°C., fast at 700°C. or higher).
14. $Cu_2S + 3 SO_3 = Cu_2O + 4 SO_2$.
15. $Cu_2O + SO_3 = 2 CuO + SO_2$.
16. Raw material will include minor pyrite, $FeS_2$.
17. $FeS_2 + 3 O_2 = FeSO_4 + SO_2$
18. $2 FeSO_4 + heat = Fe_2O_3 + SO_2 + SO_3$.

In the roasting of copper sulphides heretofore described as typical for the end purposes specified herein, reactions Nos. 2 to 9, inclusive, all occur in large degree; reactions Nos. 11 to 15, inclusive, and 17 to 18, inclusive, all occur to lesser extent. Since it is self-evident that all of these reactions require an oxidizing atmosphere, it is readily apparent that the only means of control that can be exerted toward causing them to occur in a desired sequence and to a desired degree lies in control of temperature applied at the proper point and for the proper length of time. Fortunately, differentiation of temperature is sufficiently preferential to these reactions so such control is possible. Moreover, the careful execution of hundreds of roasting tests on copper sulphide concentrates and ores from various sources widely separated geographically, with chemical analyses made at time intervals throughout the roast, have enabled me to combine the reactions into groups thereby limiting the stages (or temperature range changes) in most cases to a sequence of three temperature ranges with a total elapsed roasting time of 2.5 to 3.5 hours.

STAGE 1

Since $Fe_2O_3 \cdot 2SO_3$ is derived from the decomposition of $FeSO_4$ as in $4FeSO_4 + O_2 + heat = 2(Fe_2O_3 \cdot 2SO_3)$, it is first necessary to form $FeSO_4$. Although numerous textbooks and previous investigators state that ferrous sulphate can be formed at lower temperatures, we have found that sulphatization of iron sulphide or of the iron sulphide contained in copper-iron minerals does not vigorously sulphatize until a temperature range of 280° to 320° C. is reached, this being above the ignition point of chalcopyrite. The most important reactions at this stage are Nos. 2, 3, 5, 6 and 8 as -

$CuFeS_2 + 4 O_2 = CuSO_4 + FeSO_4$, $2 CuFeS_2 + 7 O_2 = CuO + CuSO_4 + FeO + FeSO_4 + 2 SO_2$, $8 CuFeS_2 + 27 O_2 = 6 CuO + 2 Fe_3O_4 + 2 CuSO_4 + 12 SO_2 + 2 FeSO_4$, $2 CuFeS_2 + 7 O_2 = CuO + CuSO_4 + Fe_2O_3 + 3 SO_2$, and $4 FeSO_4 + O_2 = 2 (Fe_2O_3 \cdot 2 SO_3)$.

We have found that we can best accomplish this stage by constantly stirring or rabbling the charge in an oxidizing atmosphere for 1.0 to 1.5 hours in the temperature range of 280° to 360° C., preferably not exceeding 340°C. The temperature must be at least 280°C., which is above the ignition point of the chalcopyrite in the concentrate, to insure a practical reaction speed, but not greater than 380°C. which would cause reactions to proceed at such a rapid rate that a large percentage of the evolved sulphurous gases are expelled from the roasting chamber without opportunity to combine with the copper and iron values to form the necessary compounds for the next stage.

According to Kothny (Butts-Copper Roasting, Smelting and Converting), "heating $FeSO_4$ in a current of air yields the reaction $4FeSO_4 + O_2 = 2(Fe_2O_3 \cdot 2SO_3)$ within the temperature range 170°–380°C. Between 380°C. and 530°C. little $SO_2$ is set free. Above 530°C. decomposition sets in." I checked this by laboratory experiments for authenticity, to determine the properties of the postulated products, to determine the identity of the products of decomposition mentioned, and to ascertain if the knowledge gained would explain the phenomena invariably observed to occur in the second stage of successful roasts. 200 grams of chemically pure $FeSO_4 \cdot 7H_2O$ was heated in a stainless steel pan. Water of crystallization was driven off at 200°C. The anhydrous material turned white, then yellow at 320°C. at which point there was a small amount of magnetic material present. The temperature was raised to 380°C. with no visible fumes or odor of $SO_2$. After 15 minutes at 380°C. the material was all yellow-tan in color with a small amount of magnetic particles present, was not water-soluble, but was slowly soluble in 5 percent sulphuric acid. The yellow-tan compound contained sulphur, responding positively to a BaCl test. The heat was raised to 550°C. then to 600°C. There were no fumes or odor until 550°C. then copious clouds of acrid $SO_3$ fumes suddenly arose, with still no hint of $SO_2$. The yellow-tan solids changed to a dull brown, which became bright red when cool, were nonmagnetic, nonacid-soluble, contained 70% Fe and therefore were indisputably hematite, $Fe_2O_3$. Therefore, $FeSO_4$ heated in a current of air at 320°C. becomes $Fe_2O_3 \cdot 2SO_3$ which is not water-soluble but is slowly acid-soluble. $Fe_2O_3 \cdot 2SO_3$ releases $SO_3$ at 530° to 550°C., not $SO_2$. Numerous test assays shown ± 1% Cu increase as water-soluble copper for each 1% Fe decrease as acid-soluble iron, therefore the atomic ratio of Fe:S in the sulphate-releasing compound must be approximately 1:1. Barium chloride tests show the presence of S in iron compound although it is not sulphide sulphur and compound is not water-soluble, hence is not $FeSO_4$. Water-soluble $CuSO_4$ is not plentiful in test products from early stage of roast although the roasting atmosphere abounds in $SO_2$ but $CuSO_4$ increases progressively as $SO_3$ is available. Accordingly it appears that $CuSO_4$ is formed by reaction 13 ($CuO + SO_3 = CuSO_4$) rather than the following reaction: $CuO + SO_2 + ½ O_2 = CuSO_4$. $FeSO_4$ does not yield $SO_2$ or $SO_3$ directly, to a large extent, when heat is applied in the presence of air, but changes to $Fe_2O_3 \cdot 2SO_3$ as — $4FeSO_4 + O_2 = 2(Fe_2O_3 \cdot 2SO_3)$. No sample taken from our test roasts ever contains much magnetic iron (triferric tetroxide, $Fe_3O_4$) although samples taken from the end of the first stage frequently assay as much as 15.0 percent acid-soluble Fe and 3.0 percent water-soluble Fe, thus showing that acid-soluble nonwater-soluble Fe is $Fe_2O_3 \cdot 2SO_3$, not $Fe_3O_4$. The reaction $2FeSO_4 + heat = Fe_2O_3$ + SO₂ + SO₃, cited as No. 18 above and often quoted in the literature, does not actually occur to any large extent as proved by the absence of SO₂ fumes in the stainless steel pan test described above. The tabulation of assay results on the samples taken from many roasting tests (compiled below) clearly shows that SO₃, released as such, will react readily and preferentially with CuO to form CuSO₄ at temperatures from +475°C. to +540°C., keeping in mind that the preferred range of temperature for sulphate composition and/or sulphate decomposition becomes higher as the concentration of SO₂ and/or SO₃ in the roasting chamber is increased. All compilations of reactions occurring in sulphide concentrate roasting by the present writer and others show the release of relatively large quantities of SO₃ radical. No operators report more than trace amounts of SO₃ in roaster stack gases. The ratio of acid-soluble copper to water-soluble copper in intermediate stages shows substantial amounts of CuO present, yet the absolute quantity of CuO does not increase as water-soluble copper increases and as acid-soluble iron decreases. Therefore, SO₃ must combine very readily with CuO to form CuSO₄. Also, CuSO₄ does not increase in sudden and pronounced increments until acid-soluble Fe decreases in the same abrupt manner, thus CuSO₄ does not form directly, to a large extent, as $2CuO + O_2 + 2SO_2 = 2CuSO_4$ or as $Cu_2S + SO_2 + 3O_2 = 2CuSO_4$. There is very little water-soluble iron (FeSO₄) in intermediate products which may contain a high percentage of copper in acid-soluble form, even though later reactions shown much increase in water-soluble copper, hence evidence of SO₃ transfer from Fe (other than as FeSO₄) to Cu combination. This may lend credence to the presence of $Fe_2O_3 \cdot 2SO_3$ rather than FeSO₄ with $Fe_2O_3 \cdot 2SO_3$ being acid-soluble but not water-soluble. This is especially believable since, at times, as in Test No. 8N-A2 (described below), water-soluble Cu can increase much more than the increase in acid-soluble Cu although there is no decrease in water-soluble Fe but considerable decrease in acid-soluble Fe concomitantly.

STAGE 2

The purpose of the second stage of the roast then, is to diminish the percentage of acid-soluble (which includes water-soluble) iron and to increase the percentage of acid-soluble copper and water-soluble copper by effecting a transfer of SO₃ from combination with iron to a combination with copper. This is accomplished by stirring or rabbling the charge in an oxidizing atmosphere for 1.0 to 1.5 hours at a temperature range of 475°C. to 540°C. This results in the above reaction No. 8, $4FeSO_4 + O_2 = 2(Fe_2O_3 \cdot 2SO_3)$, proceeding to practical completion accompanied in very small degree by reaction No. 18, $2FeSO_4 + heat = Fe_2O_3 + SO_2 + SO_3$ proceeding to completion, accompanied and succeeded by reaction No. 9, $Fe_2O_3 \cdot 2SO_3 + 2CuO = Fe_2O_3 + 2CuSO_4$ proceeding to completion.

STAGE 3

The third and final stage consists of stirring or rabbling the roasting material in an oxidizing atmosphere at a temperature above 580°C., preferably between 640°C. to 690°C., for 0.5 to 1.0 hours to cause the reaction No. 7, $4Fe_3O_4 + O_2 = 6Fe_2O_3$ to proceed to completion, and to incidentally insure the complete decomposition of all iron-sulphur compounds.

Figure 4:
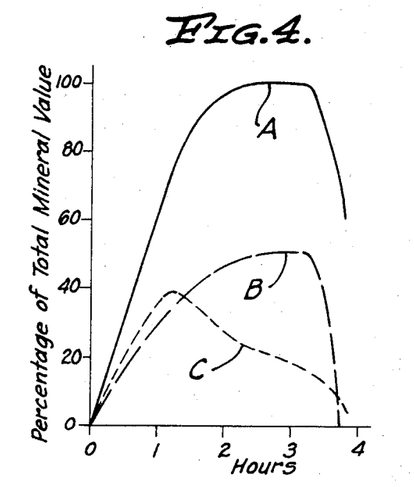
FIG. 4 is a graph showing the percentage of soluble mineral values in a roasting process employing a high temperature final step.
Figure 5:
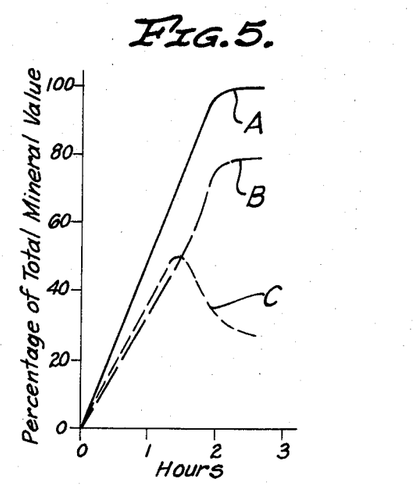
FIG. 5 is a graph showing the percentage of soluble mineral values in a roasting process employing a low temperature final step.

It is desired for the electrolytic process that the greatest possible percentage of the total iron in roasted calcine be present as red, nonmagnetic Fe₂O₃ which is insoluble in dilute sulphuric acid. If air (free oxygen) is insufficient to any degree during the latter part of the roast, the end product may be blackish, magnetic and therefore contain magnetite, Fe₃O₄, which is soluble in dilute sulphuric acid. The remedy for this condition would lie in better aeration (or oxygenation) which does not necessarily mean greater supply of oxygen to the roasting compartment but means more effective stirring or rabbling so that the oxygen could contact the mineral particle while at the temperature necessary for reaction. Also, in striving for greatest possible extent of oxidation of iron to insoluble FE₂O₃, it is necessary to conduct the final stage of the roast within the temperature range of 580°C. to 700°C., preferably between 640°C. and 690°C., in order to obtain energetic decomposition of intermediate acid-soluble iron compounds. If the temperature is below 540°C., more than 20 percent of the iron values remain as acid-soluble iron values (See FIG. 5 based on Test No. 24-N2-A2, infra). If the temperature is above 700°C., almost half the copper values remain as acid-insoluble copper values and almost all the copper values remain as water-insoluble copper values (See FIG. 4 based on Test No. 13N-A2). The exact finishing temperature required will vary with changes in SO₂ plus SO₃ content of the atmosphere surrounding those calcines which are in the finishing stage, with higher content of sulphurous gases requiring temperatures in the higher end of the 580° to 700°C. range. With very low SO₂-SO₃ concentrations present (less than 0.50 percent) the lowest temperature cited (580°C.) might be sufficient, but in no case should a temperature of 700°C. be exceeded because insoluble copper ferrites, CuO·Fe₂O₃, start to form at 710°C. and thus lead to a diminishing extractability of copper. There are just two reasons why I do not finish every roast at 690° to 700°C. One is to conserve fuel and the other is to guard against the possibility of localized hot spots which might exceed the ferrite formation temperature but not be reflected in the reading of the temperature-recording instruments. The extent to which ferrite formation is responsible for a low rate of copper extractability (in dilute sulphuric acid) can be judged by analyzing the calcine for sulphide sulphur. A very low (0.0% - 1.0%) sulfide sulphur content in calcine indicates over-roasting with consequent possible ferrite formation while a high sulphide sulphur content (2.5+%) indicates under-roasting with the probability that unroasted particles are still present.

Quick empirical judgment of the success of a roast can be made by determining if the brown end product turns to a distinct red upon cooling and if magnetic particles are almost entirely absent. The other reactions listed above, but not particularized in the description of the three stages, take place incidentally, to small degree, and will occur satisfactorily with those of major importance which are particularized. Failure of the end product to turn a distinct red upon cooling, and the presence of a considerable amount of magnetic material (Fe₃O₄) invaribaly indicates an unsatisfactory roast. Under-roasting is evidenced if chemical analysis discloses one or more of the following:

1. Presence of sulphide sulphur (CuFeS₂, FeS₂, and the like).

2. Presence of more than 0.5% Fe as water-soluble iron.
3. Presence of more than 3.5% Fe as acid-soluble iron (in 5% $H_2SO_4$). The verdict of under-roasting is fortified if one or more of the above conditions is present simultaneously with an extraordinarily high water-soluble copper content (75 percent or more of the total Cu present). A roast that is unsatisfactory because of over-roasting will be characterized by one or more of the following conditions:

1. No sulphide sulphur present.
2. Little (less than 4.0 percent) S as sulphate sulphur present.
3. Unsatisfactory percentage of copper present in forms soluble in dilute (5 percent) sulphuric acid. The verdict of over-roasting is fortified if one or more of the above conditions is present simulatneously with an extraordinarily low water-soluble copper content (25 percent or less of the total copper present).

The terms "under-roasting" and "over-roasting" are used primarily to designate temperatures applied. In this regard, it should be remembered that the effective temperature in any roast is the temperature of the particles at the point where they make contact with the gases with which they are desired to react; that different instruments for measuring temperature (even those of identical make and brand) may vary one from the other to an unpredictable degree in either plus or minus direction from the actual temperature. Therefore, all possible precautions must be taken that readings are checked and certified before their reliability is accepted.

Representative 1-kilo tests made on various copper sulphide concentrates of the specific class described above, using the preferred procedures disclosed herein, are tabulated below.

TEST NO. B-29

Copper sulphide concentrates from Bagdad Copper Corp., Bagdad, Arizona. Raw sulphide concentrates from Bagdad assayed

| % Total Cu | % Acid-soluble Cu | % Total Fe | % Acid-sol. Fe | % S | % Insol. |
|---|---|---|---|---|---|
| 26.70 | Trace | 26.80 | Trace | 28.79 | 13.86 |

| Time | °C. | % Cu | % Acid-sol. Cu | % $H_2O$-sol. Cu | % Acid-sol. Fe |
|---|---|---|---|---|---|
| 10:10 – 11:10 a.m. | 280–360 | 26.20 | 15.20 | 8.00 | 14.60 |
| 11.:10 – 1:10 p.m. | 475–540 | 24.60 | 24.60 | 15.40 | 6.60 |
| 1:10 – 3:10 p.m. | 640–690 | 24.60 | 24.60 | 15.00 | 2.50 |

Note: This test clearly shows that 1.0 hours residence time in the 280°–360° C. range is sufficient to obtain a high acid-soluble iron content in the first stage.

The total percentage of acid-soluble copper and water-soluble copper exceeds the initial percentage of copper in the concentrate because water-soluble copper is also acid-soluble (but acid-soluble copper is not necessarily water-soluble).

TEST NO. B-33

Copper sulphide concentrates from Bagdad Copper Corp., Bagdad, Arizona.

| Time | °C. | % Cu | % Acid-sol. Cu | % $H_2O$-sol. Cu | % Acid-sol. Fe |
|---|---|---|---|---|---|
| 10:30 – 11:30 a.m. | 280–360 | 24.40 | 18.60 | 11.80 | 8.40 |
| 11:30 – 1:30 p.m. | 475–540 | 23.60 | 23.60 | 15.80 | 4.30 |
| 1:30 – 3:30 p.m. | 640–690 | 23.00 | 23.00 | 14.20 | 1.60 |

Total sulphur in end product = 7.62 percent
Sulphate sulphur in end product = 7.52 percent
Sulphide sulphur in end product = 0.10 percent

TEST NO. B-2N

Copper sulphide concentrates from Bagdad Copper Corp., Bagdad, Arizona.

| Time | °C. | % Cu | % Acid-sol. Cu | % $H_2O$-sol. Cu | % Acid-sol. Fe |
|---|---|---|---|---|---|
| 10:45 – 12:00 | 280–360 | 26.20 | 17.00 | 10.68 | 11.10 |
| 12:00 – 2:00 p.m. | 470–520 | 23.60 | 23.20 | 17.64 | 4.10 |
| 2:00 – 3:00 p.m. | 640–690 | 24.00 | 23.80 | 18.80 | 1.40 |

Note: This test clearly shows that 1.0 hours residence time in the 640°–690° C. range is sufficient to obtain an end product satisfactorily low in acid-soluble iron.

TEST NO. L-3

Copper sulphide concentrates from Federal Resources, Inc., Lordsburg, New Mexico. Raw sulphide concentrates from Federal Resources assayed

| % Acid soluble Cu | % Total Fe | % Acid-sol. Fe | % S | % Insol. |
|---|---|---|---|---|
| Trace | 31.40 | Trace | 34.47 | 3.32 |

| Time | °C. | % Cu | % Acid-sol. Cu | % $H_2O$-sol. Cu | % Acid-sol. Fe |
|---|---|---|---|---|---|
| 9:45 a.m. | Cold start. | | | | |
| 10:15 | 280 | 31.20 | 16.80 | 1.00 | 20.70 |
| 10:45 | 320 | | 28.60 | 2.30 | 18.80 |
| 11:15 | 475 | | 28.60 | 4.50 | 6.90 |
| 11:45 – 12:45 p.m. | 540–640 | | 26.00 | 10.80 | 3.50 |
| 12:45 – 1:45 | 640–680 | 25.80 | 25.80 | 11.10 | 2.70 |

Note: This test clearly shows that 1.0 hours residence time in 280°–320° C. range is sufficient to obtain high acid-sol. Fe in 1st stage.

TEST NO. 7N-A2

Copper sulphide concentrates from Anaconda Co., Tucson, Arizona. Raw sulphide concentrates from Anaconda assayed

| % Acid soluble Cu | % Total Fe | % Acid-sol. Fe | % S | % Insol. |
|---|---|---|---|---|
| 1.06 | 32.40 | 3.40 | 30.63 | 4.23 |

% Total Cu
27.50

% Total Cu
32.80

| Time | Deg. C. | % Cu | % Acid-sol. Cu | % H₂O-sol. Cu | % Acid-sol. Fe | % H₂O-sol. Fe |
|---|---|---|---|---|---|---|
| 10:30 | Cold Start | | | | | |
| 12:00–1:00 | 320 | 32.40 | 27.40 | 12.40 | 5.90 | 0.40 |
| 1:00–2:00 | 475–540 | 30.20 | 30.00 | 15.00 | 2.40 | 0.20 |
| 2:00–3:00 | 640–700 | 30.40 | 30.20 | 13.20 | 2.10 | 0.15 |

Note: This test clearly shows that 1.0 hours residence time in the 475°–5.40° C. temperature range is sufficient to obtain a satisfactory high acid-soluble copper and water-soluble copper content in the second stage.

TEST NO. 9N-A2

Copper sulphide concentrates from Anaconda Co., Tucson, Arizona.

| Time | °C. | % Cu | % Acid-sol. Cu | % H₂O-sol. Cu | % Acid-sol. Fe | % H₂O-sol. Fe |
|---|---|---|---|---|---|---|
| 11:00 a.m. | Cold start. | | | | | |
| 12:00 | 320 | 32.20 | 26.80 | 10.20 | 11.30 | 0.40 |
| 1:00 p.m. | 470 | 30.80 | 29.80 | 13.60 | 6.90 | 0.30 |
| 2:00 | 540 | 29.40 | 29.40 | 12.80 | 4.60 | 0.20 |
| 3:00 | 700 | 29.80 | 29.40 | 12.00 | 3.30 | 0.15 |

TEST NO. 10N-A2

Copper sulphide concentrates from Anaconda Co., Tucson, Arizona.

| Time | °C. | % Cu | % Acid-sol. Cu | % H₂O-sol. Cu | % Acid-sol. Fe | % H₂O-sol. Fe |
|---|---|---|---|---|---|---|
| 10:45 a.m. | Cold start. | | | | | |
| 12:00 | 320 | 31.60 | 27.80 | 12.60 | 10.90 | 0.60 |
| 1:00 p.m. | 470 | 29.40 | 29.40 | 16.40 | 5.30 | 0.30 |
| 2:00 | 540 | 29.40 | 29.40 | 14.80 | 4.30 | 0.20 |
| 3:00 | 680 | 29.40 | 29.40 | 12.20 | 3.50 | 0.15 |

TEST NO. 32N-A2

Copper sulphide concentrates from Anaconda Co., Tucson, Arizona.

| Time | °C. | % Cu | % Acid-sol. Cu | % H₂O-sol. Cu | % Acid-sol. Fe | % H₂O-sol. Fe |
|---|---|---|---|---|---|---|
| 10:30 A.M. | Cold start. | | | | | |
| 11:30 | 280–340 | 27.60 | 25.40 | 18.00 | 13.60 | 3.60 |
| 12:00 | 480 | 26.40 | 26.20 | 21.40 | 6.10 | 1.20 |
| 12:30 P.M. | 480 | 26.40 | 26.20 | 21.40 | 5.90 | 0.90 |
| 1:00 | 480 | 26.60 | 26.20 | 21.00 | 4.00 | 0.70 |
| 1:30 | 540 | 26.60 | 26.60 | 20.60 | 3.20 | 0.50 |
| 2:00 | 640 | 27.00 | 26.60 | 19.80 | 2.90 | 0.40 |
| 2:30 | 680 | 27.20 | 27.00 | 19.80 | 2.60 | 0.30 |
| 3:00 | 700 | 27.40 | 27.20 | 18.20 | 2.40 | 0.25 |

TEST NO. 28-M

Copper sulphide concentrates from Magma Copper Co., San Manuel, Arizona.
Raw sulphide concentrates from Magma assayed

| % Total Cu | % Acid-soluble Cu | % Total Fe | % Acid-sol. Fe | % S | % Insol. |
|---|---|---|---|---|---|
| 29.50 | Trace | 30.14 | Trace | 31.76 | 8.56 |

| Time P.M. | °C. | % Cu | % Acid-sol. Cu | % H₂O-sol. Cu | % Acid-sol. Fe | % H₂O-sol. Fe |
|---|---|---|---|---|---|---|
| 12:30 | Cold start. | | | | | |
| 2:00 | 280–360 | 25.80 | 20.60 | 14.30 | 13.30 | 3.95 |
| 2:30 | 465–520 | 24.60 | 24.50 | 19.80 | 5.60 | 1.60 |
| 3:00 | 465–520 | 24.60 | 24.40 | 20.20 | 3.60 | 0.80 |
| 3:30 | 640–680 | 24.60 | 24.40 | 20.60 | 2.60 | 0.70 |

TEST NO. 29-M

Copper sulphide concentrates from Magma Copper Co., San Manuel, Arizona

| Time P.M. | °C. | % Cu | % Acid-sol. Cu | % H₂O-sol. Cu | % Acid-sol. Fe | % H₂O-sol. Fe |
|---|---|---|---|---|---|---|
| 12:30 | Cold start. | | | | | |
| 2:05 | 280–340 | 25.40 | 23.20 | 15.00 | 14.90 | 4.60 |
| 2:30 | 475 | 24.20 | 23.20 | 20.00 | 6.60 | 1.90 |
| 3:00 | 475 | 24.20 | 24.00 | 21.00 | 4.00 | 0.90 |
| 3:30 | 540 | 24.20 | 24.20 | 21.40 | 2.50 | 0.50 |
| 4:00–4:30 | 640 | 24.30 | 24.20 | 21.40 | 1.30 | 0.50 |

For the purpose of illustrating the effect of excessively high temperature at the beginning of the roasting procedure, we will tabulate the following

TEST NO. B-1-N, Bagdad concentrates

| Time | °C. | % Cu | % Acid-sol. Cu | % H₂O-sol. Cu | % Acid-sol. Fe |
|---|---|---|---|---|---|
| 10:45 a.m. | Cold start. | | | | |
| 11:45 | 460 | 26.20 | 25.20 | 10.40 | 8.40 |
| 12:45 p.m. | 520 | 25.60 | 25.20 | 11.20 | 5.20 |
| 1:45 | 560 | 25.40 | 24.80 | 11.20 | 2.20 |
| 2:45 | 590 | 25.20 | 24.60 | 11.70 | 1.70 |

Note: Too hot, too soon for good copper solubility.

TEST NO. 26 N2 A-2, Anaconda concentrates

| Time P.M. | °C. | % Cu | % Acid-sol. Cu | % H₂O-sol. Cu | % Acid-sol. Fe | % H₂O-sol. Fe |
|---|---|---|---|---|---|---|
| 12:30 | Cold start. | | | | | |
| 1:15 | 320–480 | 29.80 | 29.20 | 14.80 | 10.90 | 0.50 |
| 1:45 | 480 | 29.00 | 28.60 | 14.60 | 7.60 | 0.20 |
| 2:15 | 480 | 29.20 | 28.60 | 14.00 | 6.00 | 0.20 |
| 2:45 | 580 | 29.40 | 28.40 | 13.00 | 6.00 | 0.20 |
| 3:15 | 680 | 29.40 | 28.80 | 12.40 | 5.40 | 0.10 |

TEST NO. L-4, Federal Resources concentrates

| Time P.M. | °C. | % Cu | % Acid-sol. Cu | % H₂O-sol. Cu | % Acid-sol. Fe |
|---|---|---|---|---|---|
| 2:20 | 640 | 30.60 | 10.30 | 1.60 | 17.80 |
| 2:50 | 610 | | 19.10 | 1.50 | 20.50 |
| 3:20 | 580 | | 27.50 | 3.70 | 11.70 |
| 3:50 | 640 | | 25.90 | 6.30 | 6.70 |
| 4:20 | 640 | 27.20 | 26.10 | 8.30 | 4.40 |
| 4:30 | 640 | | 25.80 | 8.40 | 3.60 |
| 5:00 | 640 | | 25.65 | 8.40 | 3.50 |
| 5:30 | 640 | 27.20 | 25.70 | 8.40 | 2.70 |

For the purpose of illustrating the effect of excessively high temperatures in the middle of the roasting procedure, we tabulate the following

TEST NO. L-7, Federal Resources concentrates

| Time | °C. | % Cu | % Acid-sol. Cu | % H₂O-sol. Cu | % Acid-sol. Fe |
|---|---|---|---|---|---|
| 10:00 a.m | 0–350 | 30.40 | 11.20 | 0.36 | 22.20 |
| 10:30 | 545 | | 17.40 | 0.40 | 17.40 |
| 11:00 | 545 | | 27.80 | 3.16 | 22.20 |
| 11:30 | 650 | | 27.80 | 4.12 | 8.40 |
| 12:00 | 680 | | 27.40 | 4.84 | 7.80 |
| 12:30 p.m. | 680 | 27.60 | 27.40 | 5.05 | 7.60 |

Note: Too hot for SO₃ transfer to form CuSO₄ at 11:00–11:30 a.m.

For the purpose of illustrating the effect of excessively high temperatures at the end of the roasting procedure, we tabulate the following

TEST NO. 13N-A2, ANACONDA CONCENTRATES

| Time | °C. | % Cu | % Acid-sol. Cu | % H₂O-sol. Cu | % Acid-sol. Fe | % H₂O-sol. Fe |
|---|---|---|---|---|---|---|
| 11:45 a.m | Cold start. | | | | | |
| 1:00 p.m. | 320 | 31.40 | 24.20 | 11.80 | 12.60 | 0.45 |
| 2:00 | 480 | 29.40 | 29.40 | 14.40 | 7.70 | 0.20 |
| 3:00 | 550 | 29.40 | 29.40 | 14.60 | 6.00 | 0.15 |
| 3:30 | 800 | 37.60 | 24.10 | 0.05 | 2.70 | 0.05 |

3:30 percent Sulphur = b 0.99 percent Note: Shows Cu solubility destroyed at 800° C.

For the purpose of illustrating the effect of excessively low temperatures at the end of the roasting procedure, we tabulate the following

TEST NO. 24-N2-A2, ANACONDA CONCENTRATES.

1 kilo diluted with 100 grams pure silica sand to dissipate heat.

| Time P.M. | °C. | % Cu | % Acid-sol. Cu | % H₂O-sol. Cu | % Acid-sol. Fe | % H₂O-sol. Fe |
|---|---|---|---|---|---|---|
| 12:30 | Cold start. | | | | | |
| 2:00 | 320-360 | 26.00 | 19.60 | 12.80 | 16.30 | 5.40 |
| 2:30 | 440-510 | 24.80 | 24.40 | 18.80 | 10.30 | 3.00 |
| 3:00 | 470-480 | 24.60 | 24.50 | 19.40 | 9.10 | 2.50 |

Note: Acid-soluble iron and water-soluble iron are both too high.

Although some of the successful roasts tabulated above show time-spans totalling more than the 3.0–3.5 hours previously stated as necessary, it should be noted that time spent in going from a cold start to 280° C. is not roasting time and that some roasts were deliberately held too long at a given temperature to illustrate the principle that once the reactions typical for a given temperature range have approached completion, added time is minimally productive and appreciable progress can only be made by proceeding into the next higher temperature range.

In my experiments, test-work, and pilot demonstrations I have made many hundreds of successful roasts, starting with finely divided copper sulphide concentrates consisting predominantly of chalcopyrite, $CuFeS_2$, and a smaller number of roasts, equally successful, in which the starting material was finely ground high-grade chalcopyrite ore physically combined with iron pyrite, $FeS_2$. By following a prescribed series of stages, each within a successively higher temperature range, for a given length of time, I have succeeded in establishing a roasting process for copper ores that will produce an end product that will contain 99.0+% of its copper in a form soluble in dilute sulphuric acid and 90.0+% of its iron in a form insoluble in dilute acid. This process can be accomplished with conventional roasting equipment in half the time experienced previously by technicians who obtained results which could not be duplicated or repeated.

I claim:

1. A method of roasting copper-iron-sulphide concentrates and ores to obtain a calcined product for the separation and recovery of copper values wherein substantially all of the copper values are soluble in dilute sulphuric acid and at least 90 percent of the iron values are insoluble in dilute sulphuric acid, the method comprising the following steps: heating the copper-iron-sulphide concentrate in the presence of excess oxygen at a temperature between about 280° and about 360° C. for about 1 hour to about one and one-half hours to convert the highest portion of the iron values into dilute sulphuric acid soluble iron values; heating the concentrate in the presence of excess oxygen at a second temperature between about 475° and about 540° C. for about one hour to about one and one-half hours to convert the highest percentage of copper values into dilute sulphuric acid soluble copper values and the highest percentage of copper values into water soluble copper values; and heating the concentrate in the presence of excess oxygen at a third temperature above 580° C. but below the temperature where copper ferrites are formed for about one-half hour to one hour to convert the magnetic iron values to nonmagnetic, dilute sulphuric acid insoluble iron values without reduction in the dilute sulphuric acid soluble copper values and water soluble copper values.

2. The method according to claim 1 wherein said third predetermined temperature is between about 640° and about 690° C.

3. The method according to claim 1 wherein the sulphur value to copper value ratio in said concentrate is equal to or greater than one.

* * * * *